United States Patent
Crayford et al.

(10) Patent No.: US 6,704,296 B1
(45) Date of Patent: Mar. 9, 2004

(54) OPTIMIZED MII FOR 802.3U (100 BASE-T) FAST ETHERNET PHYS

(75) Inventors: Ian Crayford, San Jose, CA (US); Ramesh Sivakolundu, Fremont, CA (US); Bing Cheng, Mountain View, CA (US)

(73) Assignee: Advanced Micro Devices, Inc., Austin, TX (US)

( * ) Notice: Subject to any disclaimer, the term of this patent is extended or adjusted under 35 U.S.C. 154(b) by 1177 days.

(21) Appl. No.: 08/743,049

(22) Filed: Sep. 16, 1996

(51) Int. Cl.[7] .............................................. H04L 12/56
(52) U.S. Cl. ........................ 370/279; 370/492; 370/501
(58) Field of Search ................................ 370/401, 402, 370/419, 420, 438, 450, 461, 463, 492, 501, 502, 910, 315, 279, 445, 446; 375/211; 455/7

(56) References Cited

U.S. PATENT DOCUMENTS

| | | | |
|---|---|---|---|
| 5,400,332 A | * | 3/1995 | Imai ............................ 370/501 |
| 5,566,160 A | * | 10/1996 | Lo .............................. 370/246 |
| 5,754,540 A | * | 5/1998 | Liu et al. ..................... 370/315 |

FOREIGN PATENT DOCUMENTS

| EP | 0 431 751 A1 | 6/1991 |
|---|---|---|
| EP | 0 495 575 A1 | 7/1992 |

OTHER PUBLICATIONS

Somer, G., "Ethernet transceiver offers upgrade from existing networks," *Electronic Engineering*, vol. 67, No. 820, Apr. 1, 1995, pp. 25, 26, 28 and 30.

Goldberg, L., "100 Base–T4 Transceiver Simplifies Adapter, Repeater, and Switch Designs," *Electronic Design*, vol. 43, No. 6, Mar. 20, 1995, pp. 155, 156, 158 and 160.

Bursky, D., "Chip Set Delivers 100 MBITS/S to the Desktop," *Electronic Design* vol. 42, No. 1 Jan. 10, 1994, pp. 45, 46, 48, 50, 55, and 56.

Wright, M., "Network–Switch ICs Simplify Design and Slash Per–Port Costs," *Electrical Design News*, vol. 40, No. 24, Nov. 23, 1995, pp. 53–56, 58 and 60.

Saunders, St., "Switch Mixes Unlike LANs at an Unlikely Low Price," *Data Communications*, vol. 23, No. 12, Sep. 1, 1994, pp. 49–50.

Crayford, I., "10–Base–T in the Office," *Wescon Technical Papers*, vol. 35, Nov. 1, 1991, pp. 232–237.

Molle, M., et al., "100Base–T/IEEE 802.12/Packet Switching," *IEEE Communications Magazine*, vol. 34, No. 8, Aug. 1996, pp. 64–73.

* cited by examiner

*Primary Examiner*—Seema S. Rao
*Assistant Examiner*—Frank Duong
(74) *Attorney, Agent, or Firm*—Williams, Morgan & Amerson

(57) ABSTRACT

A media independent interface for interconnecting an integrated repeater front-end with one or more integrated interface devices, each having several physical layer devices for operation in conformance with IEEE 802.3u. The media independent interface, in a repeater implementation, shares transmit and receive data channels, and provides for dedicated control signals, thereby multiplexing shared channels across all of the physical layer devices in the integrated interface device.

1 Claim, 4 Drawing Sheets

OPTIMIZED MII FOR 802.3U (100 BASE-T) FAST ETHERNET PHYS

BACKGROUND OF THE INVENTION

The present invention relates generally to interconnecting PHY devices in a computer local area network, and more specifically to an optimized interface between an integrated repeater front-end and an integrated interface device having multiple PHY devices in such a network.

Computer networks are commonly used in today's business environment. One common network structure uses one or more repeaters in a star topology, each repeater having several ports. A particular data packet received at one port is retransmitted to all other ports of the repeater. Each repeater restores timing and amplitude degradation of data packets received on one port and retransmits them to all other ports, and hence over the entire network. In networks employing CSMA/CD, such as an Ethernet network, every data packet passes through every repeater.

Traditional Ethernet networks (10 BASE-T) operate at 10 Mb/s. A standard promulgated by the IEEE (IEEE Standard 802.3), hereby incorporated by reference for all purposes, defines various functionality for such computer networks. Modernly, Ethernet networks are being upgraded to support 100 Mb/s operation. Standard IEEE 802.3u, hereby incorporated by reference for all purposes, defines the functionality for such high speed networks. The Standard defines operation of 100 BASE-T systems using unshielded twisted pair (UTP) physical media types. For 100 BASE-TX, the specification defines operation over 2 pairs of category 5 (CAT 5) UTP. For 100 BASE-T4, the specification defines operation over 4 pairs of Cat 3 UTP. Additionally, 802.3u includes a 100 BASE-FX specification that allows operation over dual fiber optic cabling.

The physical layer interface (PHY) defines the physical signaling scheme between two communicating devices. Many networks often use many PHY devices operating over different media types. In order to allow data terminal equipment (DTE) or a repeater to use whichever medium is more suitable, the PHY in 100 BASE-T is segregated by a Media Independent Interface (MII), which is essentially analogous to the AUI of 10 Mb/s Ethernet. In 10 Mb/s Ethernet, the AUI is an interface consisting of only six "channels", but in 100 Mb/s operation, the interface is increased to eighteen signal "channels" in the MII. When integrated into a semiconductor device or package such as a physical housing, the channels are embodied as physical pins on the interface.

In 10 BASE-T operating at 10 Mb/s, the Ethernet/802.3 repeaters have become extremely integrated. As Ethernet has been upgraded to support 100 Mb/s operation, it has become more difficult to implement a cheap, single chip, low pin count package which houses the entire repeater functionality, especially if multiple PHY devices are integrated together.

In 100 BASE-T operation, a repeater is ideally constructed to allow some or all of its ports to be connected to any MII based PHY device. However, given the eighteen pin overhead per MII, production of integrated repeater solutions becomes more costly. A repeater front-end chip which has all MII ports for multiple PHY devices would almost certainly make the chip "pad limited". In conventional silicon processing technologies, this means that there will be so many pads for interconnect to the external device pins, that the spacing of the pads will determine the die size of the chip. Furthermore, there will be inadequate additional complexity in the logic of the chip to fill the available silicon real estate enclosed by the pad ring. Larger, more expensive chips will have to be produced to accommodate the higher pin count package which houses the entire repeater functionality. Clearly, it is desirable to reduce the pin overhead in a repeater chip, while still allowing the repeater front-end chip to connect and operate with any MII based PHY device.

SUMMARY OF THE INVENTION

The present invention provides a device for economically and efficiently interfacing a plurality of PHY devices integrated into a single semiconductor package (interface device) with an integrated repeater front-end device to produce a repeater. Making effective use of the available pins and by use of innovative design of the features of multiple integrated PHY devices, the preferred embodiment permits an effective solution that is more cost-effective than a prior art solution of simply adding additional pins. As the number of PHY devices integrated into a single package increases, the preferred embodiment of the present invention increasingly saves pin count and attendant reliability.

In the course of integrating the multiple PHY devices, a preferred embodiment of the present invention provides for an integrated device capable of having a flexibility to interoperate with any of the 100 BASE-T media types in addition to enhanced functionality. Some of these features include the ability to control transmission of security symbols for security (eavesdrop protection) using a standard MII, integration of a Carrier Integrity Monitor (CIM) state machine into the interface device to improve backward compatibility with repeater front-ends that do not implement the CIM, programmable mode control to reconfigure certain channels depending upon the environment or operational specifications. One aspect of the preferred embodiment addresses steering input ports to appropriate repeaters, such as for speed matching, load balancing or port mobility, for example. It is possible to create a dual speed repeater for 10 Mb/s and 100 Mb/s operation.

According to one aspect of the invention, it includes a first and a second PHY device for coupling to a repeater front-end. The PHY devices communicate with the repeater front-end by use of a multiplexed MII, wherein receive and transmit data channels are shared by the PHY devices and some control channels are dedicated to each PHY device.

According to another aspect of the invention, it includes a first and a second PHY for coupling to a repeater front-end, each PHY having a media independent interface. The PHY devices communicate with the repeater front-end in two different modes of operation. In one mode the PHY acts normally, while in the second mode the transmit error and receive error channels are reconfigured to operate as additional transmit and receive channels, respectively.

In yet another aspect, it includes a first PHY for coupling to a first repeater and a second PHY for coupling to a second repeater. A switch connected to both PHYs allows incoming data to one of the first and second PHYs be switched to either the first repeater of the second repeater.

A further aspect includes a PHY having a media independent interface for coupling to a repeater front-end, that operates in two modes. In one mode the collision channel operates as normal. In the second mode the collision channel is configured as a false carrier channel.

Yet a further aspect includes a security device for use with a repeater, wherein a PHY is connected to a repeater front-end. The repeater transmits a security signal to the PHY using dedicated transmit error and transmit enable channels. The PHY then responds to the received security signal by outputting a security symbol.

Another aspect includes a PHY having transmit, receive and control channels for connecting to a repeater front-end. The PHY also includes a carrier integrity monitor (CIM) for monitoring activity on the input channels of the PHY, wherein the CIM can be selectively enabled or disabled.

Reference to the remaining portions of the specification, including the drawing and claims, will realize other features and advantages of the present invention. Further features and advantages of the pre,sent invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENT

Figure 1:
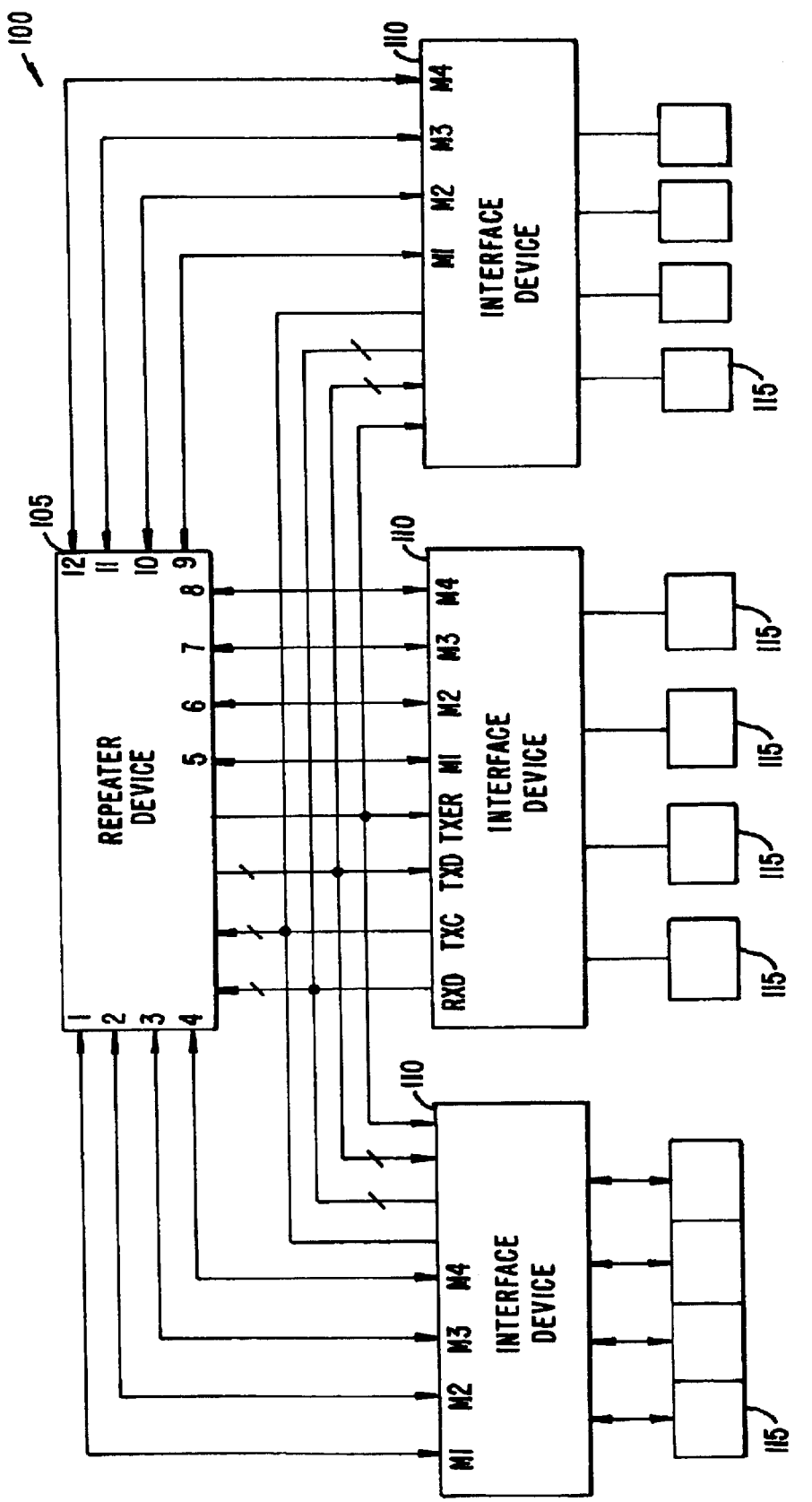
FIG. 1 is a schematic block diagram of a repeater including an integrated repeater front-end device and a group of interface devices including, in the preferred embodiment, a plurality of fast Ethernet transceivers that conform to the incorporated 802.3u IEEE standard.

FIG. 1 is a schematic block diagram of a repeater 100 including an integrated repeater front-end device 105 and a group of integrated interface devices 110 including, in the preferred embodiment, a plurality of Fast Ethernet transceivers that conform to the incorporated 802.3u IEEE standard. Each interface device 110 services a number of ports, each port coupled in turn to a network device 115, which may be a repeater, for example. In the preferred embodiment, each interface device 110 includes four physical layer (PHY) devices (not shown), one PHY per port, and repeater device 105 is coupled to three interface devices 110 to provide repeater 100 with a total of twelve ports.

The repeater device 105 and each interface device 110 are separately integrated into individual semiconductor devices that are interconnected to form repeater 100. Some applications will have different configurations for the number of interface devices 110 per repeater device 105 and/or different number of PHY devices per interface device 110, dependent upon design and cost-consideration goals.

In the preferred embodiment, each integrated PHY conforms to the IEEE 802.3u standard, except as set forth below when implementing enhanced functionality. Each PHY device communicates, with repeater device 105 by use of a modified media independent interface (MII) as further described by reference to FIG. 2.

Figure 2:
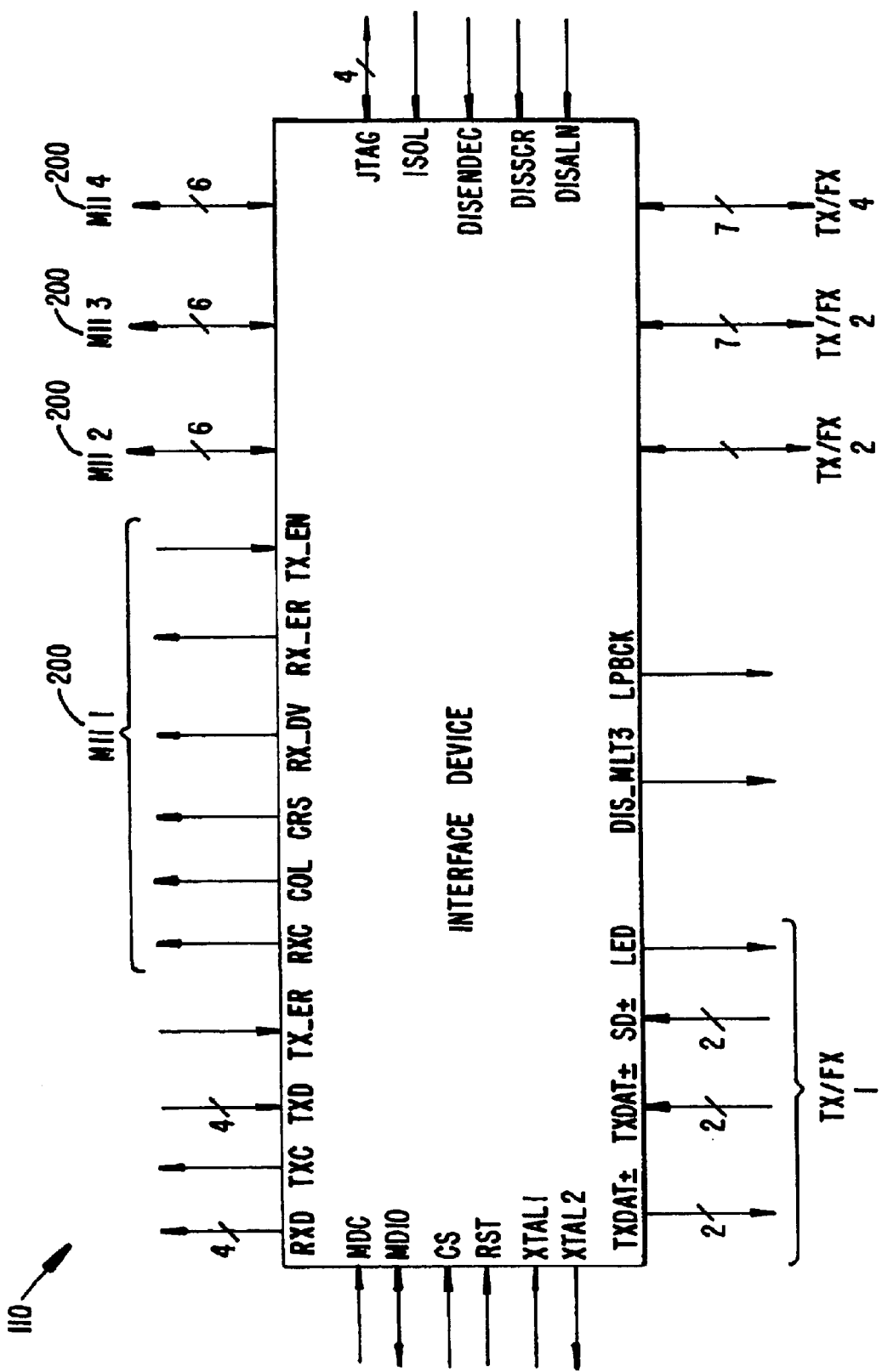
FIG. 2 is a schematic plan view of the integrated interface device shown in FIG. 1.

FIG. 2 is a schematic plan view of integrated interface device 110. The interface device 110 includes four dedicated signal ports, each marked as MII 200. Each MII 200 includes a receive clock (RXC) channel, a receive data valid (RX_DV) channel, a collision (COL) channel, a carrier sense (CRS) channel, a receive error (RX_ER) channel and a transmit enable (TX_EN) channel for a total of six channels per dedicated signal port. These six channels are port specific channels dedicated to each PHY device of integrated interface device 110.

In addition, to complete the modified MII, each PHY device shares twelve common channels into repeater device 105. Two of the shared common channels are a management data clock (MDC) channel and a management data input/output (MDIO) channel. Further, four receive data (RXD<3:0>) channels, four transmit data (TXD<3:0>) channels, a transmit clock (TXC) channel and a transmit error (TX_ER) channel. Table I, below, further explains the function of the MII channels. Hence, each PHY device uses its dedicated port channels as well as the shared channels to communicate with the repeater device 105.

TABLE I

| | |
|---|---|
| TXD <3-0> | Transmit Data. 4 pins for transmit data sent by the repeater or DTE to be transmitted by the PHY on the medium. |
| RXD <3-0> | Receive Data. 4 pins for received data recovered by the PHY from the medium and passed to the repeater or DTE. |
| RXC | Receive Clock. The clock decoded by the PHY from the incoming data from the medium. |
| TXC | Transmit Clock. The PHY's own clock, passed to the DTE or repeater, and used to clock data from the repeater/DTE. |
| TX_ER | Transmit Error. A signal asserted by the repeater (or optionally DTE) to indicate to the PHY(s) that a coding violation was detected in the received signal stream. |
| RX_ER | A signal from the PHY to indicate to the repeater or DTE that a coding violation was detected in the PHY's received data. |
| TX_EN | Transmit Enable. Asserted by the repeater or DTE to indicate that valid data is being presented on the TXD pins. |
| RX_DV | Receive Data Valid. Asserted by the PHY to indicate to the repeater or DTE that valid data is being presented on the RXD pins. |
| CRS | Carrier Sense. Asserted by the PHY to indicate receive medium activity. |
| COL | Collision. Asserted by the PHY to indicate that a collision condition has been detected on the medium. |
| MDIO | Management Data Input Output. A bi-direction line that allows serial data to be clocked in and out of the PHY device. |
| MDC | Management Data Clock. The clock signal used for synchronously transferring data in and out of the PHY using the MDIO pin. |

In operation, data from only one receive port is decoded at any time. Simultaneous activation of receive activity on two or more ports constitutes a collision. Thus, repeater device 105 does not require the actual data from more than one receive port at any time. Detection of two simultaneous receive functions causes repeater device 105 to initiate transmission of jam signals from all the ports.

Repeater device 105 determines which port to associate with received data on the shared data channels by use of the dedicated RX_DV and CRS channels associated with the receiving port. Only one PHY device, the one receiving data, asserts its RX_DV and CRS channels. The repeater device 105 reads the shared RXD channels synchronized by the RXC channel.

Repeater device 105 retransmits the received data to all other active and enabled ports. Repeater device 105 asserts the received data on the shared transmit channels and asserts TX_EN to all active and enabled PHY ports, except the receiving PHY device. The received data is transmitted from each transmitting PHY device synchronized with the TXC channel.

During the receipt and transmission of data, any collision detected by the receiving PHY device is communicated to the repeater device 105, such as by asserting the COL channel. Additionally, any other PHY device asserting RX_DV to repeater device 105 while another PHY device is receiving data signals a collision condition to the repeater device 105.

Receipt of RX_ER at repeater device 105 transmitted from a receiving PHY device causes repeater device 105 to assert TX_ER to all transmitting PHY devices. All transmitting PHY devices thereafter ensure that a code violation symbol occurs in the retransmitted signal.

In the worst case, integrated repeater device 105 would require two hundred sixteen pins (18 pins/port×12 ports) just to satisfy the channel requirements for three interface devices 110, each having four PHY devices, when a full MII is implemented for each port or PHY device. In the preferred embodiment, a conservative savings is realized because only eighty-two channels ((6 dedicated channels/port×12 ports)+ 10 shared channels) are needed for three interface devices 110 each having four PHY devices to communicate with repeater device 105, rather than the worst case two hundred sixteen channels.

In some applications, a more aggressive implementation may be used to realize even greater savings on pin count. Sometimes it may be possible to implement RXC as a single channel shared among all PHY devices, or less favorably, shared among all PHY devices of a single interface device 110. The degree to which the various ports may share a common RXC depends upon the degree to which the various ports are synchronized. Completely unsynchronized ports most likely require the configuration of the preferred embodiment (i.e., a dedicated RXC per PHY device). In other applications, it is possible to put some delay budget into the interface device 110, to allow received symbols to be realigned to a single master receive clock (the single shared RXC for all PHY devices).

In some cases, it may be desirable to multiplex only TXD and RXD channels and otherwise have dedicated MII channels. Such an application would be useful to reduce a pin count for a device such as a media access controller (MAC) directly coupled to a repeater device (such as for management). In this way, since the MAC and repeater front-end communicate using half-duplex data exchanges, the total pin complement is reduced but the MAC retains the ability to operate and examine all packet traffic that passes through the repeater device.

Another feature of interface device 110 to provide enhanced functionality is the addition of a disable encoding/decoding (DISENDEC) pin. Interface device 110 includes a four-bit/five-bit encoder/decoder function in each PHY device. In this application, five-bit symbols from the medium are converted to four-bit symbols for use across the MII. Disabling the encoding/decoding by asserting DISENDEC results in using native five-bit symbols across the MII. To obtain the extra channels for the MII without adding pins, assertion of DISENDEC reconfigures TX_ER and RX_ER channels as TX<4> and RX<4> respectively. The repeater device 105 is now able to deal with native five-bit symbols across all of its interfaces. This allows the decode and encode stages at the receiving and transmitting port(s) to be eliminated, avoiding the time required for these steps and hence reducing the delay through repeater 100.

Having an ability to reassign channel functions, either through hardware or software, provides additional pin savings while increasing flexibility and functionality of the repeater 100. It is possible to provide support for both TX and T4 protocols, on a per port or group of ports basis without adding pins by appropriately reconfiguring repeater devices 105 and interface device 110.

A TX protocol requires a false carrier (FLS_CRS) from a PHY device to the repeater device 105 while the T4 protocol does not use FLS_CRS. However, for the TX protocol, the COL channel can be denied by the repeater device 100, whereas for the T4 protocol the COL channel must be provided. To provide for flexible, per port/interface device TX/T4 support without adding dedicated channels is one feature of the preferred embodiment. The COL channel shown in FIG. 2 is made selectively configurable depending on which mode is desired. For use as a T4 PHY, the COL channel remains as described above. For TX PHY mode, repeater device 105 reconfigures the COL channel as the FLS_CRS channel. For TX operation, the TX PHY not only uses the COL channel as the FLS_CRS channel, it activates the CRS channel during only receive carrier, not for receive carrier or transmit carrier as defined in the 802.3u standard. A TX PHY indicates a collision condition to repeater device 105 by asserting CRS (receive active) and use of TX_EN (transmit active). Repeater device 105 detects the simultaneous transmit and receive activity, so it has no need of the COL channel when in TX PHY mode. Note that while Repeater Device 105 and Interface Device 110 can have their MIIs programmed to use the dedicated FLS_CRS pin when in the TX PHY mode, in addition, Interface Device 110 simultaneously provides an optional mechanism (as defined by IEEE Standard 802.3u) for indicating receive error across the MII. This is performed by asserting RX_ER, deasserting RX_DV, and sourcing the hexadecimal coded "E" (1110) representation onto the MII RXD<3:0> pins. While the transport of the coded value of false carrier is provided to support repeater device implementations that do not have the dedicated FLS_CRS pin function, this comes at the expense of some decode delay in order to detect false carrier. The provision of the dedicated false carrier pin (per port) allows fast false carrier detect time at the expense of the additional pin complement. However, Interface Device 110 fully supports either option in the Repeater Device 105."

The COL channel remains in T4 mode without providing a FLS_CRS channel. Since T4 mode does not provide for a false carrier function, a T4 PHY device does not need a channel to signal false carrier information to the repeater device 105. Thus, twelve pins are saved while providing the ability for repeater device 105 to be used with different modes of PHY devices. As long as the mode setting is performed for groups of PHY devices, or all PHY devices, or through software configuration commands, the pin savings are maintained.

U.S. Pat. No. 5,539,737, incorporated herein by reference, describes security and some of the concerns of eavesdropping in 10 Mb/s Ethernet networks. This describes how a particular port or ports may be identified to have data disrupted or allow data to pass 'clear'. However, in implementations where the PHY is integrated, the disrupt control provided by the repeater is easily communicated to the PHY. With external PHY channels, a means is needed to allow the disrupt function to be communicated without use of additional interface pins between the repeater device 105 and interface device 110. The preferred embodiment implements eavesdrop security for repeater 100 without adding additional dedicated channels between the repeater device 105 and each PHY device. The IEEE 802.3u standard provides a symbol, the 'HALT' symbol that in certain applications may seem to be an effective solution to eavesdrop protection. A PHY device responds to concurrent assertion of TX_EN and TX_ER by issuing the 'HALT' symbol. Unfortunately, concurrent assertion of TX_EN and TX_ER also indicates a transmit error which may not be appropriate to use in every situation that eavesdrop security is desired.

It is important therefore to differentiate between a normal transmit error code condition (sending the 'HALT' symbol), and the eavesdrop protection mode wherein an alternate symbol should be selected for transmission. A simple way to communicate this information between the repeater device 105 and any particular PHY device is through a special combination of the TX_EN and TX_ER channels of the MII as shown in TABLE II below.

TABLE II

| TX_EN | TX_ER | INDICATION |
| --- | --- | --- |
| 0 | 0 | Normal Inter-frame |
| 0 | 1 | Eavesdrop protection mode - Issue fixed symbol scrambling. |
| 1 | 0 | Normal Data Transmit, TXD<3:0> transmitted |
| 1 | 1 | Transmit error code, HALT transmitted |

In the preferred embodiment, a PHY,device may transmit a fixed symbol when the PHY device observes the eavesdrop protection encoding on its MII (the shared TX_ER channel and the dedicated TX_EN channel). The fixed mode would be selected to take into account issues such as backward compatibility with the existing implementations or effects such as crosstalk and/or EMI. Once determined, the eavesdrop protection code could be fixed for these devices.

Alternatively, PHY devices may incorporate an MII register which would allow the programming of the symbol sent during eavesdrop protection. The default value of this register would be either the preferred value (as determined above) or could be set to any arbitrary symbol, including the 'HALT' symbol if desired. It would be the contents of this register that any particular PHY device would transmit upon observing the eavesdrop protection code.

In the preferred embodiment, each TX PHY device includes an independently selectable integrated carrier integrity machine (CIM). A TX PHY device is not normally expected to include a CIM, therefore the preferred embodiment desirably enables/disables the CIM function for each PHY device to allow the integrated device 110 to interoperate with existing repeater devices available on the market other than the integrated repeater device 105, as well as with future more integrated devices (and devices more closely partitioned to the IEEE 802.3u standard).

Some existing integrated repeater devices that a user may desire to use in conjunction with the integrated interface devices 110 do not incorporate a carrier integrity monitor (CIM) state machine which is required by the current IEEE 802.3u standard. The carrier integrity monitor is similar to a link pulse or 'heartbeat' signal used in some Ethernet implementations. Thus, it is desirable to implement a CIM in the integrated interface device 110 so that together the devices (repeater device and interface devices) properly implement the CIM of the IEEE standard. In the preferred embodiment, it is desirable to provide one CIM for each PHY device of the interface device 110. The DISENDEC channel controls operation of all the CIMs in interface device 110.

When a CIM is turned on, or is not disabled, it monitors the carrier received from the Physical Medium Dependent layer (PMD) of the port and is responsible for generating FORCE_JAM and ISOLATE primitives as appropriate, according to the IEEE 802.3u specification. Whenever ISOLATE is true, the transmitting and receiving of the port is inhibited (the port is isolated similar to partition in the 10 BASE-T specification). The isolated port will not respond to any transmit request received on the MII. The CIM of the isolated port ensures that the interface device 110 continues to issue IDLE symbols on the serial output of the isolated port regardless of the status of the associated TX_EN channel. Any activity received from the PMD of the port will not cause the assertion of the CRS, RX_DV, or RX_ER for that port. However, it will continue monitoring the activity on the medium.

The FORCE_JAM primitive of the CIM, when true, forces repeater device 105 to send JAM to all of its ports. Because an interface device 110 does not have control of all potential ports of repeater 100, an additional process is necessary to accomplish the task of causing all ports to recognize the JAM, and to facilitate the propagation of the JAM process across all of the interface devices 110, a particular PHY device associated with a port for which the FORCE_JAM primitive is true asserts the CRS channel and maintains it asserted for as long as the FORCE_JAM primitive is true. Additionally, this PHY device transmits alternating "3" and "4" on the RXD channels. Note that an alternating "3" and "4" sequence is the JAM pattern for existing implementations of repeater circuits which translated into 4B/5B coded serial signal is a 010101 . . . bit stream. This bit stream is also transmitted to the physical medium of the port by the PHY device.

If one port goes into the FALSE CARRIER state of the CIM state machine (FORCE_JAM is true) and there is no activity detected on any other port, repeater device 105 repeats the alternating "3" and "4" JAM pattern on the RXD channels to the other ports except to the port having the FALSE CARRIER. Thus, all ports send out the JAM pattern on their physical medium, since the port that detected FALSE CARRIER independently sources the JAM sequence.

If two ports are colliding and either one, or both, of the ports is in the FALSE CARRIER state, the 100RIC should send JAM to all the ports as in the normal collision case. In the case of the "ONE PORT LEFT" condition, if the false carrier ends last, all ports continue to transmit JAM until the end of the false carrier event described in the preceding scenario. However, if the false carrier event ends first, this port will switch from independently generating the JAM sequence to retransmitting the JAM sequence from the MII, and the JAM sequence does not end during the switch process. It is desirable, depending upon specific implementations, to minimize a time difference between a start of JAM on the port having the false carrier and the start of the JAM sequence on the other ports.

Figure 3:
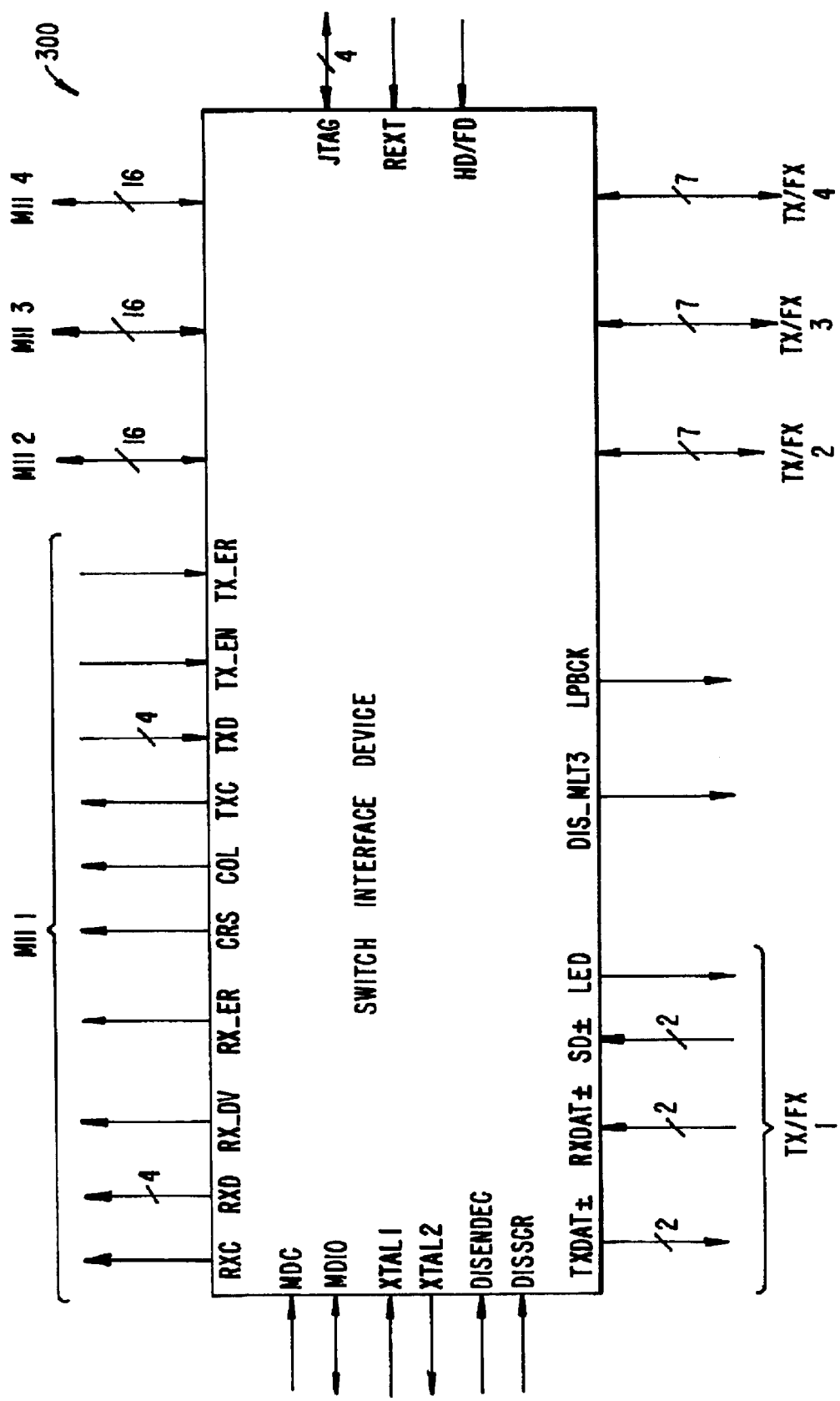
FIG. 3 is a schematic plan view of an alternate pin out option of an integrated switch interface device using the same internal semiconductor device packaged for the integrated interface device shown in FIG. 2.

The integrated interface device 110, in the preferred embodiment shown in FIG. 2, is designed for repeater applications. The internal semiconductor device of integrated interface device 110 may also be repackaged for a switch application. FIG. 3 is a schematic plan view of an alternate pin out option of an integrated switch interface device 300 using the same internal semiconductor device packaged for the integrated interface device 110 shown in FIG. 2.

The switch interface device 300 of FIG. 3 includes a 160 pin PQFP while the interface device 110 includes a 100 pin PQFP. Since a repeater application is typically much more price sensitive, the additional pin count reduction for interface device 110 is important.

As explained above, in the repeater application, a single RXD<3:0> and TXD<3:0> set of channels (pins), eight total, are multiplexed on the interface device 110 for all four ports of the PHY, with a combination of shared and dedicated control channels for the four ports. This multiplexing permits considerable pin savings over the full MII complement. Since the repeater receives from a single port at any given time, and transmits the same data on one or more of its ports, separation of TXD and RXD is necessary, but individual TXD and RXD nibble groups for each port are not necessary, since the data output from all transmitting ports is the same.

In a switch application, transmit data from any input data port is routed independently to one or more output ports, but not generally to all output ports. In addition, a switch allows many independent conversations to occur simultaneously, and may also permit full duplex operation, requiring each port to send and receive potentially different data at the same time. For the switch application, one full MII is provided for each port, with each MII having an independent TXD and RXD nibble complement.

There is a steering mode for the switch device that uses less than all of the MIIs. In this steering mode, only two of the four MIIs are active, and each one of the four PMD ports is independently coupled to either one of the MIIs. This permits 'load balancing' or 'port mobility' functions to be achieved.

Figure 4:
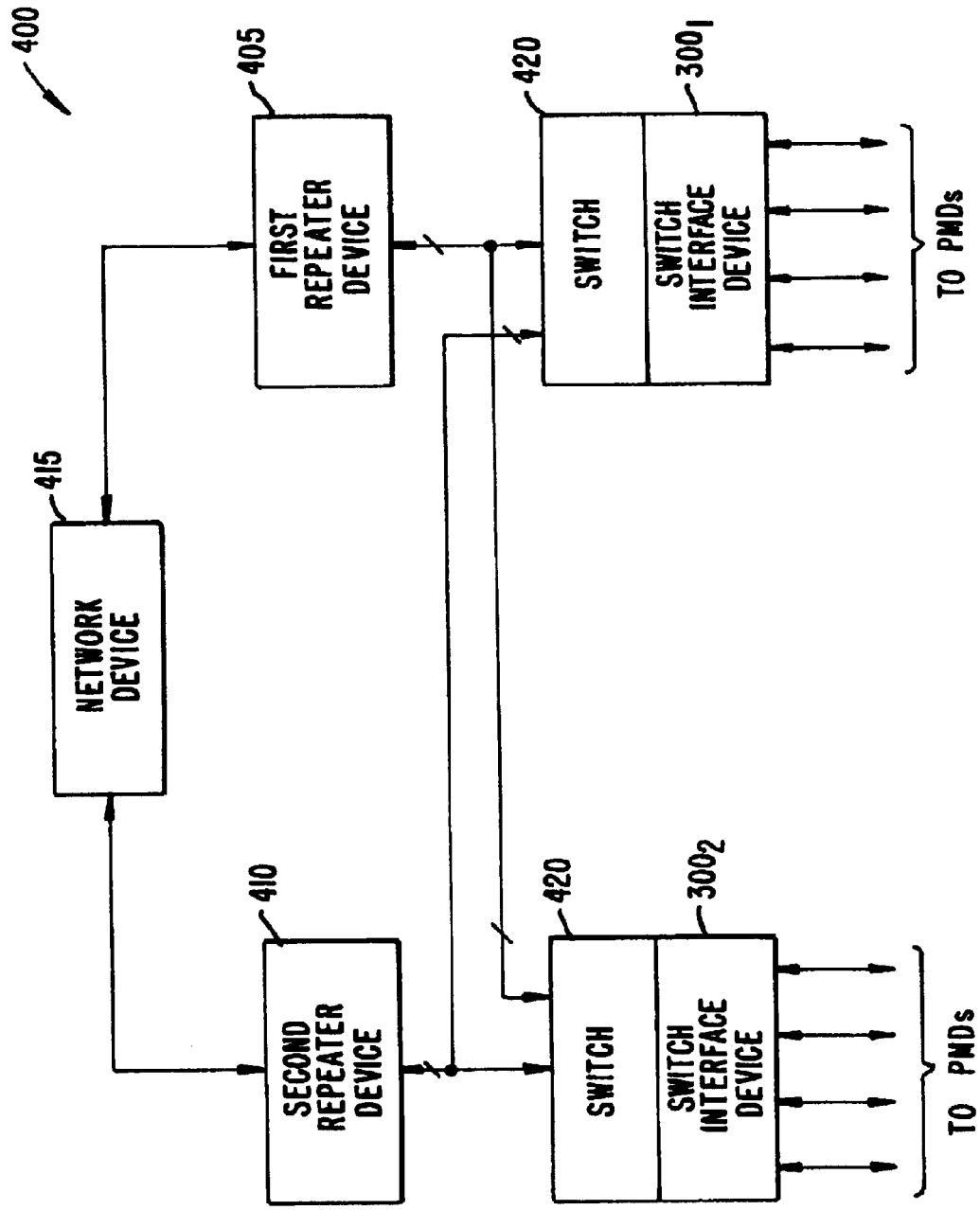
FIG. 4 is a schematic diagram of a dual repeater including a first repeater device, a second repeater device, a network device to interconnect the first repeater device with the second repeater device, two switches and two switch interface devices (first switch interface device and second switch interface device).

FIG. 4 is a schematic diagram of a dual repeater 400 including a first repeater device 405, a second repeater device 410, a network device 415 to interconnect the first repeater device 405 with the second repeater device 410, two switches 420 and two switch interface devices 300 (first switch interface device 300 and second switch interface device 300). Network device 415 is, in the preferred embodiment, a bridge or router which is known, and can be used for speed matching. Switch 420 independently routes signals from its four PMDs to either one of its 2 MIIs. Each MII of switch 420 is dedicated to one of the repeater devices, with corresponding outputs of the switches 420 coupled together for coupling to the appropriate repeater device. For example, the first MII output of each switch 420 is coupled to first repeater 405 and the second MII of each switch 420 is coupled to second repeater 410. Switch 420 includes four channels, one coupled to each MII output of switch interfaces 300. In the preferred embodiment, the switch 420 and Switch Interface Device 300 are integrated into the functionality of previously described Interface Device 110 (FIGS. 1 and 2). In addition, the pin savings identified for the MII when operating in this "dual MII to quad PMD mode" can still be realized, again minimizing the pin requirements of first and second repeater device (405 and 410 respectfully). However, some additional pins may be necessary for clocking and or speed selection.

In operation, any MII output from a PHY device of first switch interface $300_1$ may be routed to either first repeater device 405 or second repeater device 410. Similarly, any MII output from a PHY device of second switch interface device $300_2$ may be routed to either first repeater device 405 or second repeater device 410. If both the first and the second repeater device operate at 100 Mb/s, there would effectively be two collision domains, each operating at 100 Mb/s. This provides for load balancing and an ability to move a port to a desired repeater domain.

A more preferred embodiment provides for first repeater device 405 to operate at 100 Mb/s and for second repeater device 410 to operate at 10 Mb/s. Thus, each MII from switches 420 to the repeater devices operate at different speeds. This is a valid use of the MII, which operates at 25 MHz (×4 bits) for 100 Mb/s operation and at 2.5 MHz (×4 bits) for 10 Mb/sec operation. Each PHY device of the switch interface devices 300 are dual speed (10/100 capable) and designed to Auto-Negotiate between these two speeds. Such dual speed PHY devices, and Auto-Negotiation, are common and widely known in 10/100 BASE-T implementations. By providing the dual MII for four PHY device ports, a 10/100 repeater is constructed, where PHY devices are either forced or allowed to steer themselves (after Auto-Negotiation has completed the speed negotiation of the link and corresponding end station of any particular port). In this way, each front panel port of repeater 400 can support either a 10 Mb/s or a 100 Mb/s station. When connected to the repeater port, the speed capability of the connected device is detected and the PHY device is coupled into the appropriate speed collision domain of the dual speed collision domain repeater.

In conclusion, the present invention provides a simple, efficient solution to a problem of providing a repeater including an integrated repeater device coupled to one or more integrated interface devices in a cost effective and flexible manner. While the above is a complete description of the preferred embodiments of the invention, various alternatives, modifications, and equivalents may be used. Therefore, the above description should not be taken as limiting the scope of the invention which is defined by the appended claims.

What is claimed is:

1. An integrated device for use with a repeater front-end, the device comprising:

a first PHY having first receive channels for receiving data from the repeater front-end, first transmit channels for transmitting data to the repeater front-end and first control channels for transmitting and receiving control signals from the repeater front-end; and a second PHY, integrated into a semiconductor device with said first PHY, having second receive channels coupled to said first receive channels for receiving data from the repeater front-end, second transmit channels coupled to said first transmit channels for transmitting data to the repeater front-end, and second control channels independent from said first control channels for receiving and transmitting control signals from the repeater front-end.

* * * * *